Patented Mar. 7, 1950

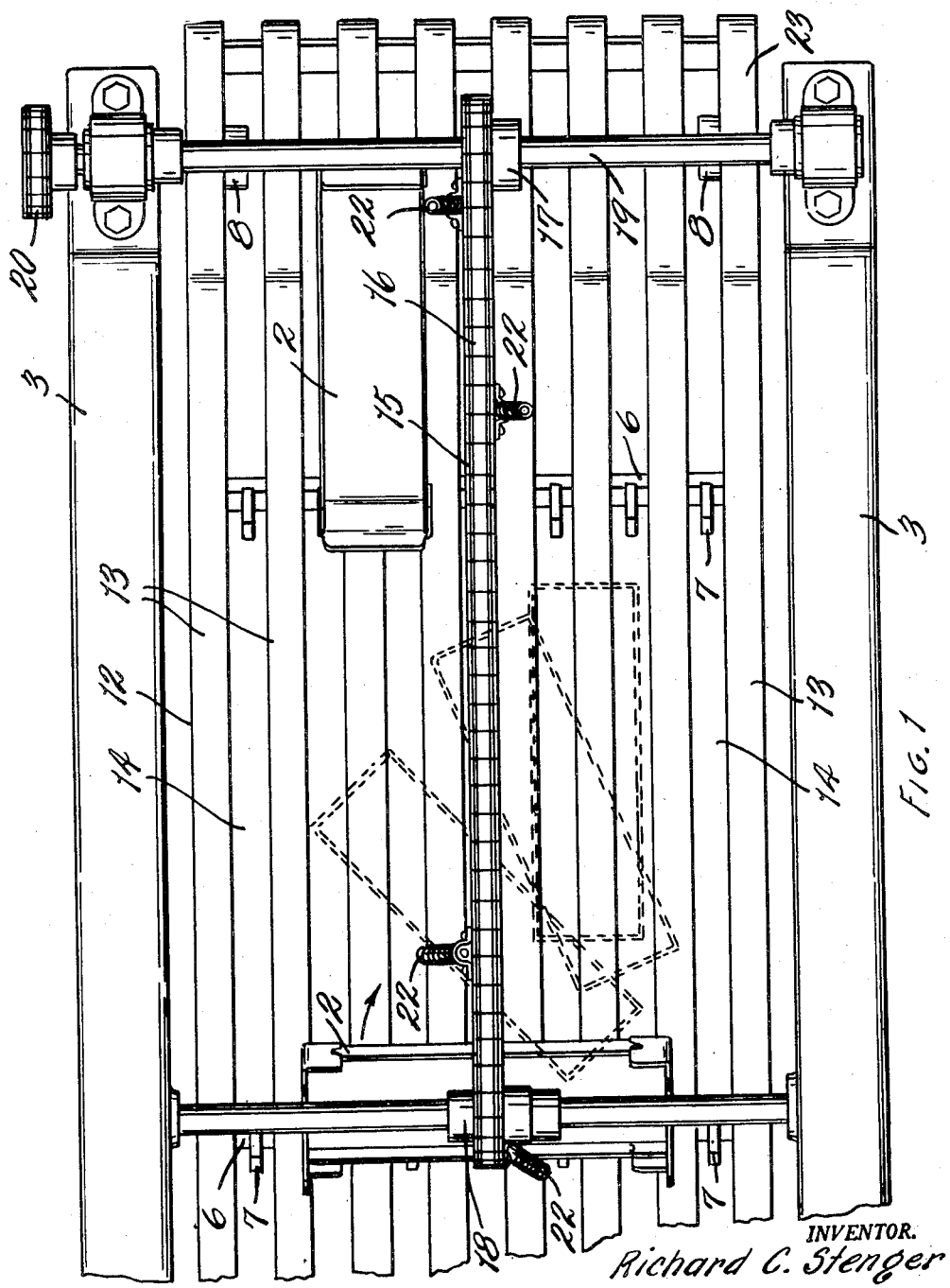

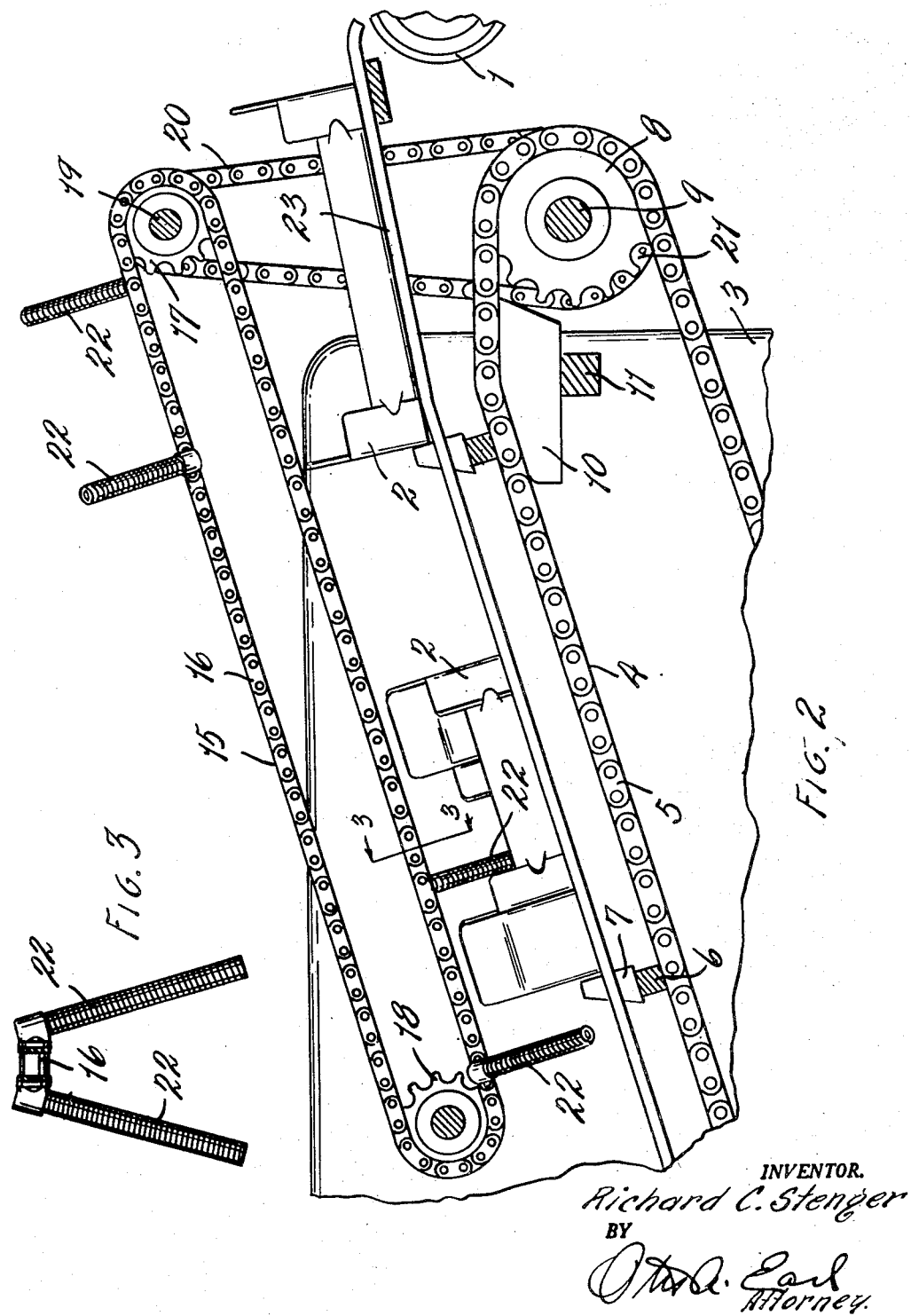

2,499,694

UNITED STATES PATENT OFFICE 2,499,694

CONVEYING AND POSITIONING MECHANISM FOR CARTONS AND THE LIKE

Richard C. Stenger, Kalamazoo, Mich., assignor to Sutherland Paper Company, Kalamazoo, Mich.

Application January 10, 1949, Serial No. 70,026

8 Claims. (Cl. 198—31)

1

This invention relates to improvements in conveying and positioning mechanism for cartons and the like.

The main objects of this invention are:

First, to provide a conveyor mechanism for positioning and delivering cartons which is adapted to deliver the cartons in two rows and spaced in the rows thereby facilitating the operation of filling the cartons.

Second, to provide a conveyor mechanism of the class described which is adapted for the handling of relatively light cartons without injury thereto or without deforming or disengaging the walls of erected cartons.

Third, to provide a conveyor mechanism having these advantages which is of large capacity.

Objects relating to details and economies of the invention will appear from the description to follow. The invention is pointed out in the claims.

A preferred embodiment of the invention is illustrated in the accompanying drawing, in which:

Fig. 1 is a fragmentary plan view of a conveyor embodying my invention, one carton being illustrated in full lines in a position received from an erecting machine not illustrated and another being illustrated in full lines in a position for delivery, other intermediate positions of cartons being indicated by dotted lines.

Fig. 2 is a fragmentary side elevational view with parts shown in longitudinal section and other parts omitted for convenience in illustration.

Fig. 3 is an enlarged fragmentary view through the positioning conveyor on a line corresponding to line 3—3 of Fig. 2.

The mechanism of my invention is designed to be used in connection with a carton or tray erecting machine, not illustrated, and also in connection with a conveyor designated generally by the numeral 1 by which the positioned cartons are translated to operators who fill them or insert the contents as they are conveyed past the operators' stations.

One of the objects of my invention is to deliver the erected cartons designated by the numerals 2 in two rows to the conveyor so one or more operators may work on each side of the conveyor 1. As the erecting machine and the details of the conveyor 1 form no part of the present invention they are not illustrated except the conveyor 1 is indicated in Fig. 2 to show the relation of my conveyor mechanism thereto. 3 represents the supporting frame generally although parts of the frame and the prime mover parts or the driving means are not illustrated.

The feed conveyor designated generally by the

2 numeral 4 comprises sprocket chains 5 having cross pieces 6 thereon suitably spaced longitudinally thereof and carrying the flights 7. The chains are trained over the driving sprockets 8 on the shaft 9. The upper reach of the conveyor is supported by the guides 10 carried by the cross piece 11 so that the rear portion of the forward or work reach of the conveyor is inclined downwardly. The conveyor way designated generally by the numeral 12 is made up of slats or longitudinal bars 13 spaced laterally to provide longitudinal slots 14 through which the flights 7 project for translating work along the conveyor way. The work 2 is ordinarily delivered from the erecting machine upon the conveyor way to extend in a transverse relation thereto as shown at the left of Fig. 1.

It is desired to position the trays or cartons longitudinally of the conveyor way as they are translated along the same so that they are delivered to the conveyor 1 in two rows and endwise. To accomplish this I provide a positioning conveyor designated generally by the numeral 15 and comprising a chain 16 trained over the driving pulley 17 and supported by the pulley 18. The sprocket 17 is carried by the shaft 19 connected by the sprocket chain 20 to a suitable sprocket 21 on the shaft 9. It will be noted that the sprocket 21 is substantially larger than the sprocket 17 with the result that the positioning conveyor is driven at a speed exceeding that of the feed conveyor.

The positioning conveyor is provided with positioning fingers 22 arranged in longitudinally spaced pairs. The fingers of the pairs being longitudinally spaced and oppositely inclined, the fingers being arranged in a substantial inwardly inclined relation, that is, inwardly inclined relative to the positioning conveyor 16. These fingers are desirably formed of yieldable coil springs which engage cartons as they are picked up and translated by the feed conveyor and swing them or turn them from the transverse position to the longitudinal position shown in Fig. 1. The fingers of the pairs are reversed as to their angular relation so successive cartons are positioned on opposite sides of the positioning conveyor and the cartons are delivered to the filling conveyor in two rows and spaced in the rows which facilitates the filling thereof. The delivery end 23 of the conveyor way is angularly disposed relative to the forward part of it so that the fingers clear the cartons as they approach delivery position. Other means than those illustrated might be provided for retracting the flights and the fingers.

The mechanism of my invention is of large capacity and handles the trays or cartons without injury thereto.

I have illustrated and described my invention in a highly practical embodiment thereof. I have not attempted to illustrate or describe other embodiments or adaptations as it is believed that this disclosure will enable those skilled in the art to embody or adapt the same as may be desired.

Having thus described my invention, what I claim as new and desire to secure by Letters Patent is:

1. In a conveyor for positioning and delivering cartons and the like, the combination of an endless feed conveyor provided with longitudinally spaced series of flights, a slideway disposed above said feed conveyor and having longitudinal slots therein through which the flights project to push work along the way, the rear end of the feed conveyor being supported in a rearwardly inclined relation to the conveyor way so that the flights are retracted to release the work at delivery position, an endless positioning conveyor mounted centrally above said slideway in vertically spaced relation thereto, means for driving said positioning conveyor with its lower reach traveling in the same direction as the upper reach of the feed conveyor and at a speed exceeding that of the feed conveyor, and pairs of yieldable coiled spring work aligning fingers mounted on said positioning conveyor in longitudinally spaced inwardly inclined relation, said pairs of fingers being longitudinally spaced and their relative angular relation on the conveyor being reversed, the rear end of the slideway being downwardly inclined relative to the rear end of the positioning conveyor.

2. In a conveyor for positioning and delivering cartons and the like, the combination of an endless feed conveyor provided with longitudinally spaced series of flights, a slideway disposed above said feed conveyor and having longitudinal slots therein through which the flights project to push work along the way, an endless positioning conveyor mounted centrally above said slideway in vertically spaced relation thereto, means for driving said positioning conveyor with its lower reach traveling in the same direction as the upper reach of the feed conveyor and at a speed exceeding that of the feed conveyor, and pairs of yieldable coiled spring work aligning fingers mounted on said positioning conveyor in longitudinally spaced inwardly inclined relation, said pairs of fingers being longitudinally spaced and their relative angular relation on the conveyor being reversed.

3. In a conveyor for positioning and delivering cartons and the like, the combination of an endless feed conveyor provided with longitudinally spaced series of flights, a slideway disposed above said feed conveyor and having longitudinal slots therein through which the flights project to push work along the way, the rear end of the feed conveyor being supported in a rearwardly inclined relation to the conveyor way so that the flights are retracted to release the work at delivery position, an endless positioning conveyor mounted centrally above said slideway in vertically spaced relation thereto, means for driving said positioning conveyor with its lower reach traveling in the same direction as the upper reach of the feed conveyor and at a speed exceeding that of the feed conveyor, and work aligning fingers mounted on said positioning conveyor in longitudinally spaced inclined relation, the rear end of the slideway being downwardly inclined relative to the rear end of the positioning conveyor.

4. In a conveyor for positioning and delivering cartons and the like, the combination of an endless feed conveyor provided with longitudinally spaced series of flights, a slideway disposed above said feed conveyor and having longitudinal slots therein through which the flights project to push work along the way, an endless positioning conveyor mounted centrally above said slideway in vertically spaced relation thereto, means for driving said positioning conveyor with its lower reach traveling in the same direction as the upper reach of the feed conveyor and at a speed exceeding that of the feed conveyor, and work aligning fingers mounted on said positioning conveyor in longitudinally spaced inclined relation.

5. In a conveyor for positioning and delivering cartons and the like, the combination of an endless feed conveyor provided with longitudinally spaced series of flights, a slideway disposed above said feed conveyor and having longitudinal slots therein through which the flights project to translate work along the way, the rear end of the feed conveyor being supported in a rearwardly inclined relation to the conveyor way so that the flights are retracted to release the work, and an endless positioning conveyor mounted centrally above said slide conveyor way in vertically spaced relation thereto and having longitudinally spaced pairs of outwardly and downwardly projecting oppositly projecting flexible coiled spring work engaging fingers adapted to engage work on the conveyor and align it thereon, first on one side and then on the other side of the path of travel of the positioning conveyor, the rear end of the slideway being downwardly inclined so that the fingers clear the work during the later part of their forward travel, and means for driving said positioning conveyor at a speed exceeding that of the feed conveyor so that the positioning fingers engage and position the work as it is being translated on the feed conveyor way by the feed conveyor.

6. In a conveyor for positioning and delivering cartons and the like, the combination of an endless feed conveyor provided with longitudinally spaced series of flights, a slideway disposed above said feed conveyor and having longitudinal slots therein through which the flights project to translate work along the way, and an endless positioning conveyor mounted centrally above said slide conveyor way in vertically spaced relation thereto and having longitudinally spaced pairs of outwardly inclined and downwardly projecting oppositely projecting flexible coiled spring work engaging fingers adapted to engage work on the conveyor and align it thereon, first on one side and then on the other side of the path of travel of the positioning conveyor, and means for driving said positioning conveyor at a speed exceeding that of the feed conveyor so that the positioning fingers engage and position the work as it is being translated on the feed conveyor way by the feed conveyor.

7. In a conveyor for positioning and delivering cartons and the like, the combination of an endless feed conveyor provided with longitudinally spaced series of flights, a slideway disposed above said feed conveyor and having longitudinal slots therein through which the flights project to translate work along the way, the rear end of the feed conveyor being supported in a rearwardly inclined relation to the conveyor way so that the flights are retracted to release the work, and an endless positioning conveyor mounted above said slide conveyor way in vertically spaced relation thereto having depending work engaging fingers adapted to engage work on the conveyor as it is translated thereon, the rear end of the slideway being downwardly inclined so that the fingers clear the work during the later part of their forward travel, and means for driving said positioning conveyor at a speed exceeding that of the feed conveyor so that the positioning fingers engage and position the work as it is being translated on the feed conveyor way by the feed conveyor.

8. In a conveyor for positioning and delivering cartons and the like, the combination of an endless feed conveyor provided with longitudinally spaced series of flights, a slideway disposed above said feed conveyor and having longitudinal slots therein through which the flights project to translate work along the way, and an endless positioning conveyor mounted above said slide conveyor way in vertically spaced relation thereto having depending work engaging fingers adapted to engage work on the conveyor as it is translated thereon, and means for driving said positioning conveyor at a speed exceeding that of the feed conveyor so that the positioning fingers engage and position the work as it is being translated on the feed conveyor way by the feed conveyor.

RICHARD C. STENGER.

No references cited.